United States Patent
Kudtarkar et al.

(10) Patent No.: US 11,706,628 B2
(45) Date of Patent: *Jul. 18, 2023

(54) NETWORK CYBER-SECURITY PLATFORM

(71) Applicant: Level 3 Communications, LLC, Broomfield, CO (US)

(72) Inventors: Mayur Kudtarkar, Broomfield, CO (US); Kirsten Jensen Coppo, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,787

(22) Filed: May 16, 2022

(65) Prior Publication Data
US 2022/0279356 A1 Sep. 1, 2022

Related U.S. Application Data

(63) Continuation of application No. 17/025,712, filed on Sep. 18, 2020, now Pat. No. 11,337,076.
(Continued)

(51) Int. Cl.
*H04L 12/60* (2006.01)
*H04W 12/60* (2021.01)
(Continued)

(52) U.S. Cl.
CPC ......... *H04W 12/66* (2021.01); *H04L 63/0263* (2013.01); *H04L 63/20* (2013.01);
(Continued)

(58) Field of Classification Search
CPC ..... H04W 12/66; H04W 12/37; H04W 12/69; H04W 60/00; H04L 63/0263; H04L 63/20; H04L 63/10
See application file for complete search history.

(56) References Cited

U.S. PATENT DOCUMENTS 10,375,572 B2    8/2019  Achim
11,206,543 B2 *  12/2021 Do ...................... H04L 63/1433
(Continued)

OTHER PUBLICATIONS

International Search Report and Written Opinion of the International Searching Authority, dated Nov. 23, 2020, Int'l Appl. No. PCT/US20/051569, 15 pgs.

*Primary Examiner* — Baotran N To

(57) ABSTRACT

A security platform of a data network is provided that includes security services for computing devices in communication with the data network. The security platform may apply a security policy to the computing devices when accessing the Internet via a home network (or other customer network) and when accessing the Internet via a public or third party network. To provide security services to computing devices via the home network, the security platform may communicate with a security agent application executed on the router (or other gateway device) of the home network. In addition, each of the devices identified by the security profile for the home network may be instructed or otherwise be provided a security agent application for execution on the computing devices. The security agent application may communicate with the security platform when the computing device connects to the Internet over a third party or public access point.

17 Claims, 6 Drawing Sheets

Related U.S. Application Data

(60) Provisional application No. 62/905,929, filed on Sep. 25, 2019.

(51) Int. Cl.
*H04W 12/37* (2021.01)
*H04W 12/69* (2021.01)
*H04L 9/40* (2022.01)
*H04W 60/00* (2009.01)

(52) U.S. Cl.
CPC ........... *H04W 12/37* (2021.01); *H04W 12/69* (2021.01); *H04W 60/00* (2013.01)

(56) References Cited

U.S. PATENT DOCUMENTS

| | | | |
|---|---|---|---|
| 11,337,076 B2 * | 5/2022 | Kudtarkar | H04L 63/0263 |
| 2008/0082662 A1 | 4/2008 | Dandliker | |
| 2010/0205665 A1 | 8/2010 | Komili | |
| 2014/0096251 A1 | 4/2014 | Doctor et al. | |
| 2015/0215334 A1 | 7/2015 | Bingham et al. | |
| 2019/0021005 A1 | 1/2019 | Stan | |
| 2020/0288306 A1 | 9/2020 | Do | |
| 2021/0092596 A1 * | 3/2021 | Kudtarkar | H04W 60/00 |
| 2022/0279356 A1 * | 9/2022 | Kudtarkar | H04W 12/69 |

* cited by examiner

NETWORK CYBER-SECURITY PLATFORM

CROSS-REFERENCE TO RELATED APPLICATION

This application is related to and claims priority under 35 U.S.C. § 119(e) from U.S. Patent Application No. 62/905,929, filed Sep. 25, 2019 entitled "NETWORK CYBER-SECURITY PLATFORM," the entire contents of which is incorporated herein by reference for all purposes.

TECHNICAL FIELD

Embodiments of the present invention generally relate to systems and methods for implementing a data network, and more specifically to a network cyber-security platform providing security protocols to devices associated with the data network.

BACKGROUND

Data or telecommunication networks may provide Internet access to one or more devices connected to the network through a wired or wireless interface. For example, a modem within a user's home network may connect to the data network and provide access to the Internet for devices communicating with the modem. In some instances, the modem may be located at a customer premises, such as a customer's home or place of business, or may be located away from the customer premises. For example, a computing device, such as a laptop computer or smart phone, may access the Internet via a data network via a private router located at the customer premises. The computing device may later connect to the Internet via a public modem (or other connecting device) outside of the premises, such as at a public library, a coffee shop, a hotel lobby, an airport, etc. Such connections may be with the modem through a WiFi connection. In general, WiFi is a wireless communication standard that allows for the generation of wireless local area network (WLAN) of devices. A typical WLAN set-up includes a modem that broadcasts a wireless signal to multiple wireless devices and acts as a gateway device to a larger network over which connection to the Internet is available.

Accessing the Internet may open computing devices to potential malicious actions intended to obtain sensitive or secret information from the computing devices, harm the devices, or take over control of the device for some malicious purpose. For example, a website may include a link or file that, when accessed by the computing device, downloads a virus or malware to the computing device. The virus or malware may disrupt the operation of the computing device or may obtain information stored on the computing device and transfer that information to a third party. In another example, some websites on the Internet may include explicit material or images that may be unsuitable for children or others. Data networks or computing devices may therefore include features that attempt to prevent devices from downloading or accessing malicious or harmful content on the Internet.

It is with these observations in mind, among other, that aspects of the present disclosure were conceived.

SUMMARY

One aspect of the present disclosure relates to a method for providing security features to a network. The method may include the operations of configuring, based on an input provided to a user interface associated with a security platform of a data network, a security policy for a wireless network, the security policy comprising a plurality of security rules for interacting with a public network and instructing a routing device of the wireless network and a device in communication with the routing device to each install a security application configured to communicate with the security platform. The method may also include the operations of receiving, from the security application of the device or the routing device, a request to access the public network and transmitting, to the security application of the device or the routing device, the security action based on a parameter of the received request and the security policy for the wireless network, the security action comprising an instruction for processing the request to access the public network.

Another aspect of the present disclosure relates to a networking apparatus comprising a processing device and a non-transitory computer-readable medium encoded with instructions. When the instructions are executed by the processing device, the processing device may perform the operations of configuring a security policy for devices communicating with a wireless network, the security policy comprising a plurality of security rules for interacting with a public network, transmitting an instruction to a routing device of the wireless network and a device in communication with the routing device to each activate a security application configured to communicate with a security platform of a data network, receiving, from the security application, a request to access the public network, the request originating from the device, and instructing the security application to execute an action on the request to access the public network, the action based on a security rule identified by a parameter of the received request.

Yet another aspect of the present disclosure relates to a security platform for a network comprising a database storing a plurality of security profiles, each of the plurality of security profiles associated with a corresponding customer network and a security controller. The security controller may receive, via a user interface, one or more user inputs indicating a plurality of security rules for inclusion in one of the security profiles associated with a first customer network, the security policy comprising a plurality of security rules for interacting with a public network, configure, based on the indicated plurality of security rules, a security policy for the first customer network, and instruct a routing device of the first customer network and a device in communication with the routing device to each install a security application configured to communicate with the security controller. The security controller may also receive, from the security application of the device, a request to access the public network and transmit, to the security application of the device and based on a request from the device to access the public network, a security action based on a parameter of the received request and the security policy for the first customer network.

DETAILED DESCRIPTION

Figure 1:
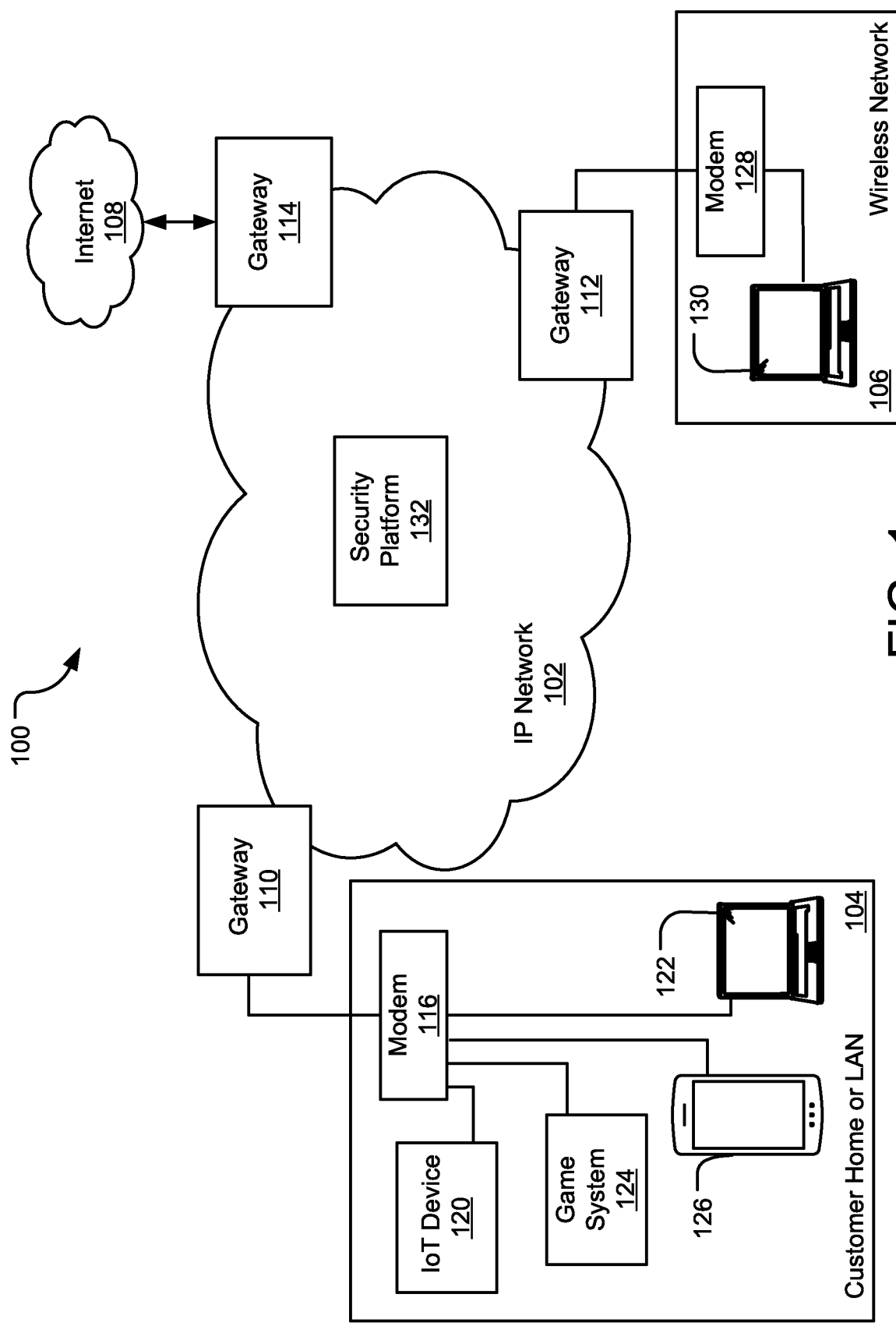
FIG. 1 is a schematic diagram illustrating an exemplary Internet Protocol (IP) operating environment in accordance with one embodiment.

Aspects of the present disclosure involve systems, methods, and the like, for a security platform of a data network providing security services to one or more computing devices in communication with the data network. In one implementation, the security platform may apply a security policy to the computing devices when accessing the Internet via a home network (or other customer network) and to the computing devices when accessing the Internet via a public or third party network. The policy may be generated or configured at a security platform in or associated with the data network. To provide security services to computing devices via the home network, the security platform may communicate with a security agent application executed on the router (or other gateway device) of the home network. The security agent application may be provided to the router and/or activated by the security platform in response to configuration of a security policy associated with the home network. The security agent application activated on the router may monitor access to the Internet and block or otherwise prevent downloading of malicious or harmful files or data from the Internet. In another implementation, the security policy for the home network may include security parental controls that prevent or monitor access to particular websites or particular content of the Internet. The configuration of the parental controls may include identifying devices in communication with the router of the home network, associating those devices with family members, employees, etc., and establishing content-based rules for one or more of the identified devices. The security platform and/or the router of the home network may apply the parental control security rules for each identified device based on the security profile for the network.

In addition, each of the devices identified by the security profile for the home network may be instructed or otherwise be provided a security agent application for execution on the computing devices. The security agent application may communicate with the security platform to monitor and/or control access to the Internet based on the security profile for the home network. Further, the security agent may also communicate with the security platform when the computing device connects to the Internet over a third party or public access point. For example, a mobile computer (such as a laptop) or smart phone may connect to the Internet via a public network or other network access point away from the home network. The security agent application executed on the mobile computer may communicate with the security platform when connecting to the Internet and the security profile for the home network may be applied to the Internet access for the mobile computer. In this manner, the security profile, including parental security controls, configured for the home network may also be applied to the identified computing devices whether connecting to the Internet via the home network or via a third party, out-of-home network.

In some instances, the security agent application downloaded or executed by the router/gateway device and/or the computing devices identified by the home network may be installed as a container-based application on the respective operating systems of the computing devices. In this manner, the security applications may be installed on the computing device and/or router regardless of the manufacturer of the device via an abstraction layer within the operating system. As such, the computing device and/or router may be a third party device separate from a data network administrator to provide the in-home and out-of-home security to the devices associated with the in-home network.

FIG. 1 is a schematic diagram illustrating an exemplary Internet Protocol (IP) operating environment in accordance with one embodiment. In general, the environment 100 provides for establishing communication sessions between network users and the Internet 108. One or more networks (such as customer network 104 and wireless network 106) may connect to an IP network 102 to provide and receive communications between devices associated with the networks 104-106 and the Internet 108. With specific reference to FIG. 1, the environment 100 includes an IP data network 102, which may be provided by a wholesale network service provider. The IP network 102 includes numerous components such as, but not limited to gateways, routers, route reflectors, and registrars, which enable communication and/or provides services across the IP network 102. Communications between the IP network 102 and other entities or networks, such as the one or more customer home or business local area networks (LANs) 104-106, may also be managed through network environment 100. In some instances, the customer network 104-106 may form a Wireless Local Area Network (WLAN) in which wireless devices may communicate with the network 102 via a respective modem 116, 128 or similar network communication device.

Customer networks 104-106 can include computing devices such as, but not limited to, a personal computer 122, wireless communication device 126, gaming console 124, Internet of Things (IoT) devices 120, etc., connected to a modem 116. In general, the computing devices may include any type of device that receives a multimedia signal, such as an audio, video or web-based signal, and presents that signal for use by a user of the computing device. In many cases, the computing device 110 may be a wireless computing device. The components of the connected network 104-106 enable devices of the network to communicate via the IP network 102 to other communication devices or to the Internet 108. For example, a laptop computer 122 of home network 104 may utilize the modem 116 to access the Internet 108 to view a webpage, download a document, send or receive an e-mail, and the like. Components of the customer networks 104-106 are typically home- or business-based, but they can be relocated and may be designed for easy portability.

The customer or wireless networks 104-108 typically connect to the IP network 102 via respective gateways 110-114 or other network edge devices. The IP network 102 may also connect to other networks (collectively known herein as the "Internet" 108) through a gateway 114 or other edge device. For example, home network 104 may include a modem 116 in communication with gateway 110. One or more computing devices 120-126 may communicate with the modem 116, either via a wired or wireless connection, to transmit instructions, packets, signals, or other communications for transmission to one or more servers or other destinations of the Internet 108. The IP network 102 may transmit the received communications to gateway 114 for connection to the destination device of the Internet 108. The communications may thus include an identifier of the destination device, such as a destination Internet Protocol (IP) address or other address identifier. In some instances, the network 102 may host the destination device. Regardless, the network environment 100 may provide a connection path between the computing device 120-126 of the home network 104 to one or more devices of the Internet 108. A similar Internet connection service may be provided to other networks of the IP network 102, such as wireless network 106, such that mobile computing devices may connect to both the home network 104 and the wireless network 106, despite the home network and wireless network having geographically disparate locations, as discussed in more detail below.

Figure 2A:
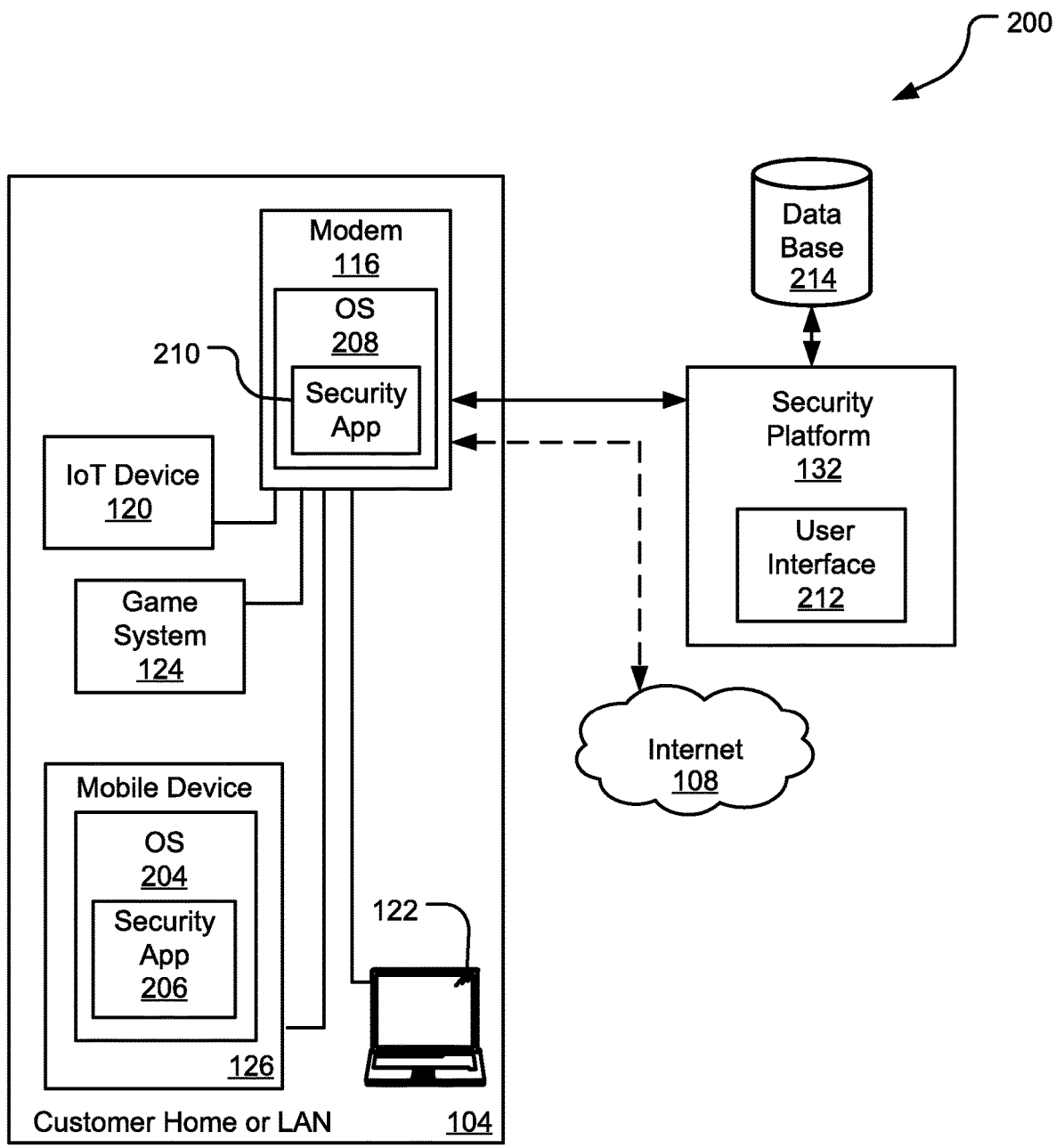
FIG. 2A is a schematic diagram illustrating a security platform for providing security procedures to devices within an in-home network in accordance with one embodiment.

In some instances, the network 102 may include a security platform 132 configured to provide security services to networks 104-106 or devices connected to the network 102. For example, security platform 132 may provide security services, such as firewall capabilities, parental control, content-monitoring and blocking, and the like, to devices 120-126 connecting to the Internet 108 via modem 116. FIG. 2A is a schematic diagram illustrating a network environment 200 including one such security platform 132 for providing security procedures to devices 120-126 within an in-home network 104 in accordance with one embodiment. Components of the home network 104 are similar to those described above such that the home network 104 may include one or more communication devices (computer 122, mobile device 126, gaming system 124, IoT device 120, etc.) in communication with modem 116. The modem 116 may provide a communication path to the Internet 108, as described above. A security platform 132 may also be included in environment 200 for providing security services to the devices 120-126 of the home network 104. In particular and as described in more detail below, the security platform 132 may communicate with a security agent application 210, installed on the modem 116 and executed by operating system 208, to configure and execute security services for accessing the Internet 108. The security platform 132 may also communicate with a security application 206 installed on one or more of the computing devices 120-126, such as security application 206 executed by operating system 204 of mobile device 126, to provide security services to the device upon which the application 206 is installed.

In addition to communicating with security applications 206, 210, the security platform may also communicate with a database 214 storing various information associated with providing security services, including but not limited to, security profiles, customer identifiers, computing device identifiers, security rules, and the like. The database 214 may also store information associated with destinations, devices, files, etc. of the Internet, such as classifications of websites, identified malicious files or links, fingerprints or other identifiers of potential harmful viruses, a reputation score for websites, and the like. The Internet destination information may be provided to the database 214 from a third party source or may be generated from an analysis of the Internet content or traffic patterns associated with network 102. For example, a computing device associated with the database 214, such as an application server or other configurable computing device, may access webpages of the Internet 108 and analyze the content of the accessed webpages. Analysis of the webpages may include scanning the software code associated with the webpage for particular words, phrases, or images that may provide an indication of the content of the webpage. For example, particular words or phrases obtained from the code of a webpage may indicate the webpage is a gambling site. In another example, particular words or phrases obtained from the code of a webpage may indicate the webpage is a pornographic site. Matching the words of the code of a webpage may allow the application server to categorize the webpage based on the webpage content. In some instances, the category associated with the webpage may be a default categorization if the code does not include the scanned for words or phrases. The categorization of the webpage may then be stored in the database 214 for use by the security platform 132, as described below.

In another instance, the application server of the database 214 may execute a hash function on files downloaded from destinations within the Internet 108 and compare the determined hash value to hash values of known malicious files. In some instances, the hash values of known malicious files of the Internet 108, such as viruses or malware programs, may be received from third party systems configured to detect and provide threats disseminated on the Internet 108. The application server of the database 214 may determine hash values for requested files or programs from the devices 120-126 of the home network 104 and compare such values to known hash values of harmful files. The hash values for the known harmful files may be similarly be stored in the database 214 for use by the security platform 132.

The security platform 132 may include one or more programs that are executed by the platform to provide security services to devices of the home network 104. For example, the security platform 132 may include a user interface 212 through which a user or customer of the network 102 may configure aspects of the security services provided to the home network 104. In some instances, the user interface 212 may display security feature options, display computing devices 120-126 of the home network 104, may receive one or more inputs to configure or establish a security policy for the home network 104, show results of application of security rules of the policy to the computing device 120-124, and the like. Additional aspects of the user interface 212 are discussed below with reference to the operations of the security platform 132.

Figure 2B:
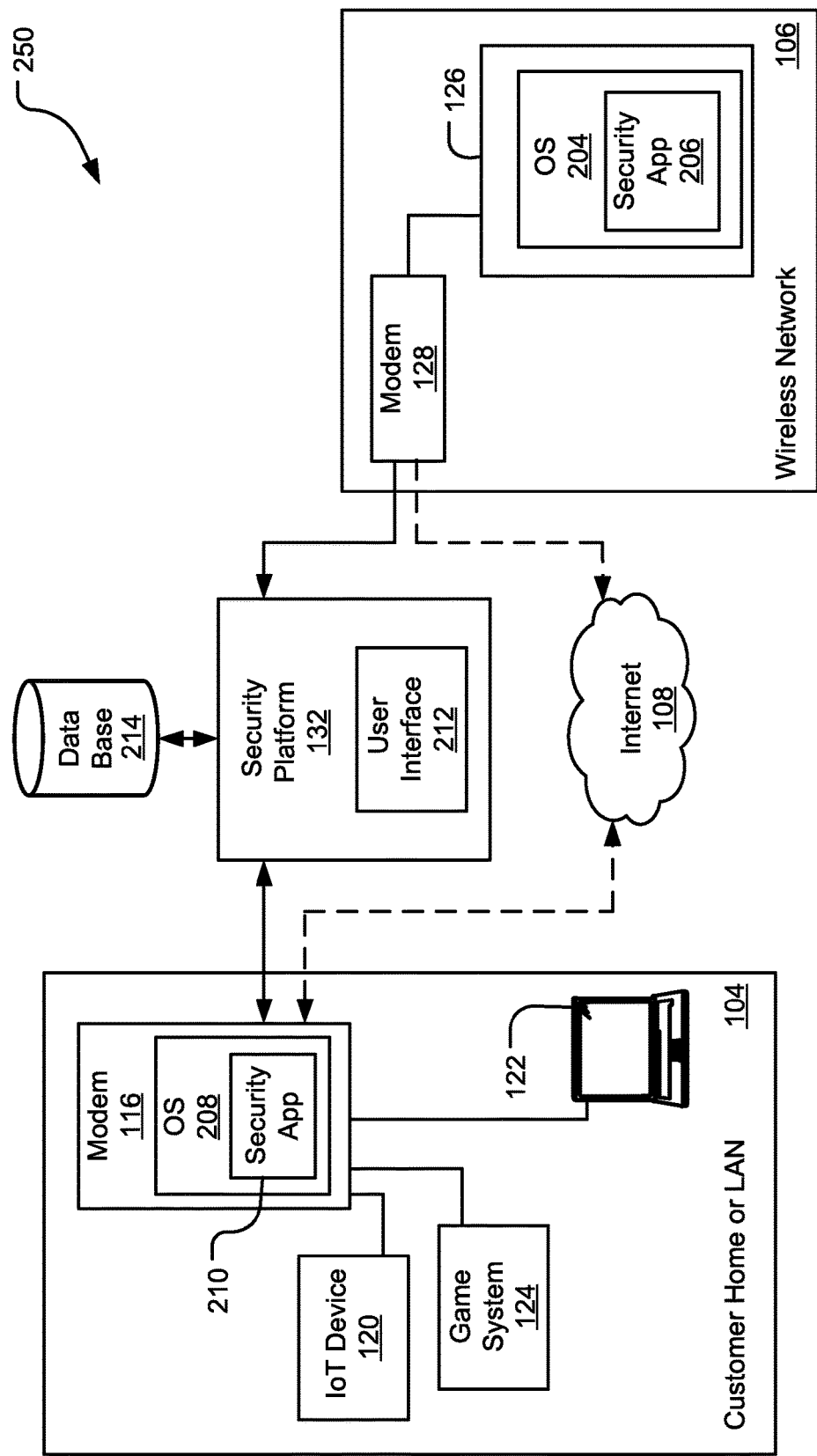
FIG. 2B is a schematic diagram illustrating a security platform for providing security procedures to devices connected to an out-of-home network in accordance with one embodiment.

As discussed above, the security platform 132 may provide security services to the devices 120-126 of the home network 104 when such devices are connected to the Internet via a network different than the home network. For example, FIG. 2B is a schematic diagram illustrating a network environment 250 for a security platform 132 providing security procedures to a device 126 connected to an out-of-home network 106 in accordance with one embodiment. Several of the components of the environment 250 are similar or the same as that of FIG. 2A. For example, home network 104 may include modem 116 executing operating system 208 and security agent 210, IoT device 120, game system 124, and computer 122, as described above. The modem 116 may communicate with a security platform 132 to provide security services for the devices accessing the Internet 108.

In some instances, computing device 126 may be a mobile device such that the device may be carried to a location other than the home network 104. For example, the mobile device 126 may be a smart phone or laptop that is portable. Further, the mobile device 126 may connect to other wireless or wired networks for access to the Internet 108, such as wireless network 106. For example, a public library or coffee shop may establish a wireless network 106 for computing devices associated with patrons of the establishment to connect, generally over a Wi-Fi connection, to the Internet 108. As shown in FIG. 2B, public wireless network 106 may include modem 128 that provides access to the Internet 108. In general, the modem 128 may broadcast a wireless signal to which computing devices may discover and connect to exchange communications with the modem 128. In one example, the modem 128 may broadcast a Service Set Identifier (SSID) that indicates to the computing device 126 a wireless connection is available for connecting to the Internet 108. In some instances, a password or other exchange of credentials between the modem 108 and the mobile device 126 may occur before connection to the Internet 108 is established. Regardless, once connected, the mobile device 126 may communicate with devices or destinations of the Internet 108 to receive information or data.

As mentioned above, the modem 116 of the home network 104 may include a security application 210 in communication with the security platform. The security application 210 may apply one or more aspects of a security policy as configured by the security platform 132 for devices connecting to the Internet 108 via the modem 116. For example, the security application 210 may intercept requests for access to the Internet 108 from a computing device, such as IoT device 120, and determine, based on rules included in the security policy for the home network 104 provided by the security platform 132, whether access to the Internet should be provided to the IoT device 120 or denied. Other actions may also be taken by the security application 210 based on the rule set of the security policy for the home network 104. In another example, the security application 210 may provide the requests for access to the Internet 108 from the computing devices 120-124 to the security platform 132. The security platform 132 may execute the security policy on the access request and provide a response to the modem 116 to allow access, deny access, or undertake some other action on the request. Regardless, the modem 116 and the security application 210 of the home network 104 may provide security services to the computing devices 120-124 connected to the modem 116 as provided or configured by the security platform 132.

For computing devices of the home network 104 that attempt to connect to the Internet 108 via an out-of-home wireless network, such as wireless network 106, the security platform 132 may be configured to apply the security profile for the home network 104 to the mobile device 126. In particular, the security application 206 executed on the mobile device 126 may direct access requests for the Internet 108 to the security platform 132, regardless of which modem or network the mobile device is utilizing to connect to the Internet 108. The security platform 132 may communicate with and provide instructions or other data to the security application 206 of the mobile device 126 to execute the rules of the security policy for the home network 104. Such rules may include parental controls, virus protection, content monitoring, and the like. In this manner, the security platform 132 may apply the security profile of the home network 104 to mobile computing devices 126 registered with or otherwise associated with the home network 104, regardless of which devices or networks the mobile device 126 uses to request access to the Internet 108.

Figure 3:
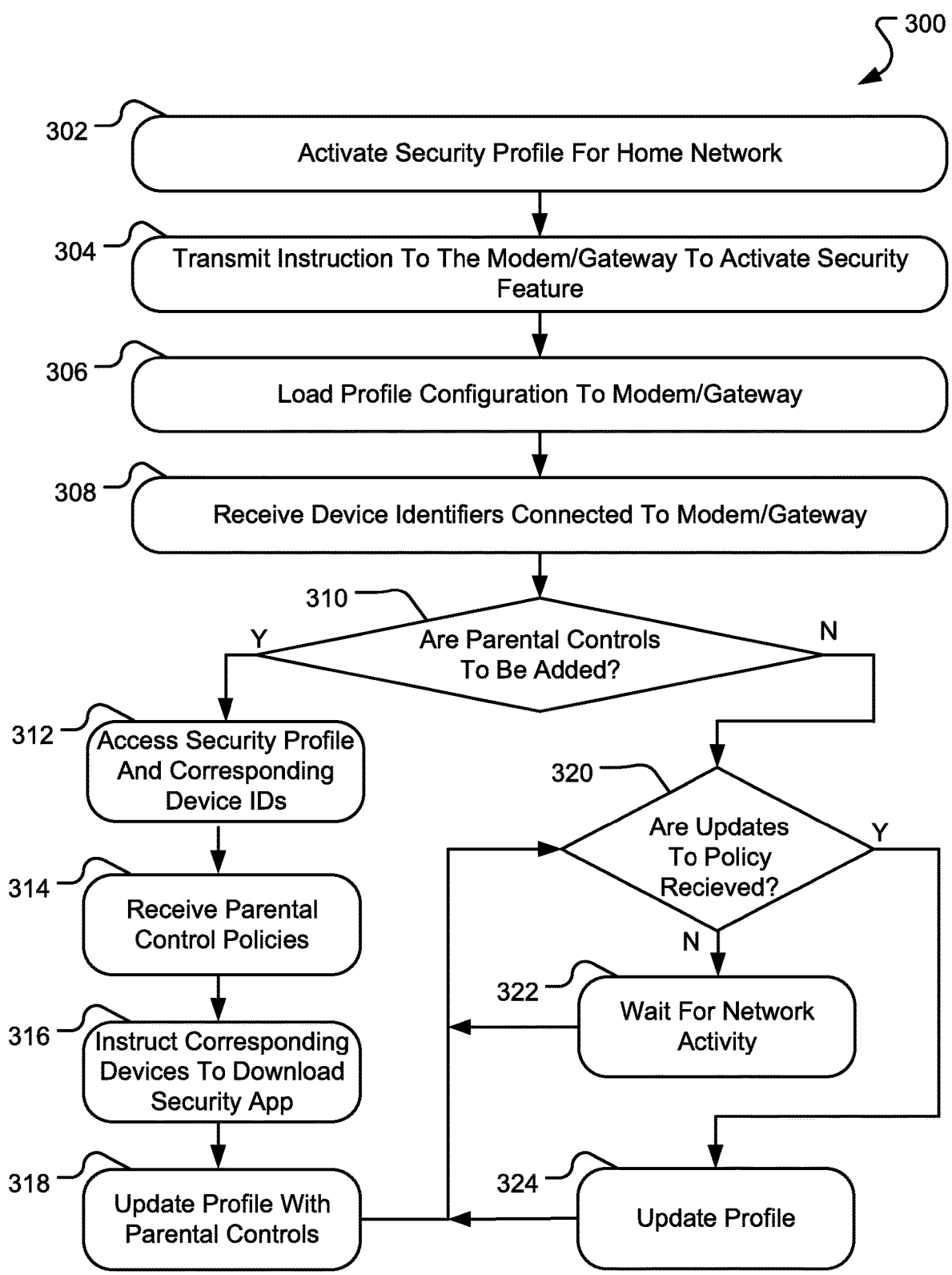
FIG. 3 is a flowchart illustrating a method for configuring a security platform of a data network to provide security services to devices connected to the data network in accordance with one embodiment.

To establish a security profile for the home network 104, a user, administrator, or other entity in control of the home network 104 may access the security platform 132 to configure the security profile. FIG. 3 is a flowchart illustrating a method 300 for configuring a security platform of a data network to provide security services to devices connected to the data network in accordance with one embodiment. In general, the operations of the method 300 may be performed by the security platform 132, in some cases in response to one or more inputs received via the user interface 212. Other components of the network environments 200, 250 discussed herein, such as security application 210, 206 or computing devices 116, 126, may perform other operations of the method 300. The operations may be executed through a combination of hardware components of the computing device and one or more instructions stored on a computer-readable medium of the device.

In operation 302, the security platform 132 activates a security profile for a user or home network 104 in communication with the security platform. In some instances, the user of the security platform 132 may be associated with or administer a wireless or other network connected to the data network 102. For example, an administrator of home network 104 (such as a home owner, account owner, or other customer of the data network 102 associate with the home network 104) may access the user interface 212 of the security platform 132 to request a security feature for the home network 104. The user may access the user interface 212 via a computing device my logging into the user interface and, in some instances, providing credentials such as a user identifier and/or password. The security platform 132 may compare the received user credentials to a database of network users to verify the user's identity. The database (which in some instances may be database 214) may also include network identification information that identifies the home network 104 associated with the user. For example, the network identification information may include one or more IP addresses of devices associated with the network 104, a home or physical address location of the network, a service plan associated with the network, technical information (such as a bandwidth of the connection between the home network 104 and the data network 102), and the like.

In addition to accessing the user/home network information, the security platform 132 may also, via the user interface 212, receive a request to activate one or more security features for the home network 104 and define or configure a security policy for the home network 104. The request may be received as an input to the user interface 212 through a selection of an option displayed on the user interface 212 to security activation. Such a selection may include selection of a package of security features for the network 104 or may include selection of individual security features available for the network 104. Upon selection of one or more security features, the security platform 132 may create or otherwise activate a security policy for the home network 104. The security policy may also be associated with the user logged into the user interface 212. For example, the security policy may be associated with a customer profile, a home network identifier, a user identifier, or the like. The activation of the security policy for the home network 104 may include accessing various databases of the data network 102, including a billing database and/or a customer support database, to indicate the activation of the security policy for the home network 104.

In operation 304, the security platform 132 may transmit one or more instructions to the modem/gateway device 116 to activate one or more security features for the home network 104. The instructions may be transmitted to the modem 116 in response to the activation of the security policy for the home network 104. For example, the security platform 132 may transmit an activation signal to the modem 116 to cause the modem to launch the security application 210 within the operating system 208 of the modem 116. The security platform 132 may transmit the activation signal to the modem 116 based on the information accessed by the security platform 132 or included in the security profile for the home network 104. Upon launch, the security application 210 may register with the security platform 132 to begin receiving additional instructions or commands. Thus, in some instances, the security application 210 may be pre-loaded on the modem 116 for activation by the security platform 132. The modem 116 may be associated with or provided to the home network 104 by the data network 102. In another example, the security platform 132 may, based on the modem/network information accessed above, may transmit a request to the modem 116 to download the security application 210 from the security platform 132 or from another source of the data network 102. Upon launch, the security application 210 may request additional security information from the security platform 132 to apply a security policy for the home network 104.

In operation 306, the security platform 132 may load or otherwise provide a security policy configuration to the security application 210. As explained in more detail below, the security policy for a home network 104 may be configured via inputs provided to the user interface 212 by a network administrator. Such a security policy configuration may include parental controls, virus detection and prevention, malware detection and prevention, and the like. The various countermeasures to potential threats on the Internet 108 may define the security policy for the home network 108. For example, the policy may cause the security application 210 of the modem 116 to intercept connection or other requests intended for the Internet 108 and transmit or otherwise provide information of the requests to the security platform 132 for analysis. The types of requests intercepted by the security application 210 may be based on the security policy for the home network 104. Thus, the security policy may include instructions on which requests are intercepted and which are allowed to be transmitted, by the modem 116, to the Internet 108 for connection to an Internet-based device. For example, the security policy for the home network 104 may include virus protection such that requests to download a file from the Internet may be intercepted by the security application 210 for verification with the security platform 132. In another example, the security policy may include one or more parental controls that verify the content of each requested webpage against a parental rule established for the requesting device. In such instances, the security application 210 may intercept each request for a webpage for verification against the parental control. The number and types of Internet requests intercepted by the security application 210 of the modem 116 may be determined by the security policy supplied by the security platform 132.

In some instances, the security policy may be configured based on inputs provided by the user of the security platform 132. For example, the user, via the user interface 212, may select security features offered via the security platform 132, may provide information or configurations of parental controls, may provide blocked websites via a black list, may provide allowed websites via a white list, and the like. In another example, one or more default security features, such as virus and/or malware protection, may automatically be included in the security policy for the home network 104 upon activation of the security profile by the security platform 132. In another example, various security features may be configured, via the user interface 212, for the various components or devices 120-126 of the home network 104. For example, in operation 308, the security platform 132 may receive one or more device identifiers of devices connected or in communication with the modem/gateway 116 of the home network 104. In particular, the modem/router 116 may receive or assign an identification from each device requesting connection to the wireless network emitted by the modem 116. For example, computer 122 may request connection to the SSID network transmitted by the modem 116 and, within the request, include a Media Access Controller (MAC) identifier or another device identifier unique to the computer 122. The modem 116 may store the identifier received from the computer 122 for use in transmitting wireless signals to the computer 122. In another example, the computer 122 may request connection to the modem 116 and, in response, the modem may assign a temporary IP address to the computer 122 at which the computer may receive communications. The IP address assigned to the computer 122 may also be stored by the modem 116. The other devices within the home network 104 may similarly provide or be assigned an identifier when connecting to the modem 116.

In some instances, the modem 116 may classify or estimate a type of device associated with the received or assigned identifiers. For example, a device 120-126 of the home network 104 may frequently access particular websites or servers within the Internet 108. The ownership or maintenance of the accessed server may provide an indication of an owner or type of device, obtained from a database of IP addresses and companies associated with the IP addresses. For example, a smart phone requesting connection to a server identified as being operated by Company A may be determined to be a device manufactured by Company A. The modem 116 may analyze communication packets from that device and extract a destination IP address from the communications and correlate, via a database of IP addresses, an association of the destination address with Company A. In another example, the modem 116 may analyze requests from a device of the network 104 and determine that a majority of the requests comprise Domain Name Server (DNS) requests. The modem 116 may thus determine that the particular device is a smart television. The modem 116 may, upon determining a possible type and/or manufacturer of a device, provide the estimated type and/or manufacturer of the device to the security platform 132 for use in configuring the security policy for the home network, as explained below.

In operation 310, the security platform 132 may determine if one or more parental controls are to be added to the security policy for the home network 104. Determination of the addition of parental controls may be based on one or more inputs received via the user interface 212. For example, a user of the interface 212 may provide an input selecting to add one or more parental control security features to the security policy for the home network 104. In one instance, the security platform 132 may display a list of detected devices of the home network 104 and, in some instances, the estimated device type/manufacturer of the detected devices. Each detected device may have its own security policy or parental controls. For example, the smart phone 126 of the network 104 may have a first security policy associated with the device and the gaming system 124 may have a second security policy associated with the device. Parental controls may therefore added to each device individually or as a group as the security policy for the network 104 is configured.

If the security platform 132 determines that parental controls for one or more devices of the network 104 are to be added, the platform may access the security profile for the home network 104 and the corresponding device identifiers received above. As mentioned, each device 120-126 connected to the modem 116 of the home network 104 may provide or be given a device identifier that is provided to the security platform 132. Each device identifier may be associated with the security profile of the home network 104 such that each device identifier of the home network 104 may be accessed and displayed via the user interface 212. In operation 314, the security platform 132 may receive parental control policies for one or more of the devices 120-126 associated with the home network 104. In one example, a user may utilize the user interface 212 to select one of the devices shown and provide one or more of the parental controls discussed above (such as white list, black list, category or content blocks, etc.) to be applied to the selected device. The same or different parental controls may be applied to the devices 120-126 of the network 104. In this manner, the security policies for each detected device of the home network 104 may be configured individually by a user of the interface 212.

In operation 316, the security platform 132 may instruct one or more of the devices 120-126 of the home network 104 to download a security application for execution of the security policies associated with that device. For example, security platform 132 may transmit an instruction or message to mobile device 126 instructing the operating system 204 to download security application 206 to continue to access the Internet 108 via modem 116. In another example, security platform 132 may transmit an instruction to modem 116 to instruct mobile device 126 to download security application 206. The security application 206 of the computing devices 120-126 may, in some instances, provide a status indicator to the modem 116 informing the modem 116 that the security application was downloaded and is executed by the operating system of the corresponding device. The modem 116 may, in determining that the security application 206 is not operational on the device 126, may deny Internet access for that device until the security application is activated. A similar application may be downloaded and executed by IoT device 120, game system 124, and computer 122 of the home network 104. In some instances, only those devices identified for parental controls 210 in the above operations may be instructed to download the security application 206. As described in more detail below, the security application 206 on the computing devices 120-126 of the home network 104 may aid in applying the security policy for that device when connecting through networks other than the home network 104.

In operation 318, the security platform 132 may update the security policy for the home network 104 with the parental controls of each device associated with the network. Through the update, the security platform 132 may maintain a current security policy associated with home network 104. In operation 320, the security platform 132 may determine if additional updates to the security policy of the home network 104 are received, such as via the user interface 212. For example, additional updates to the security policy may be received via the user interface 212, such as additional parental controls for application to one or more of the devices 120-126 of the home network 104. If no updates to the security policy are received, the security platform 132 may wait for network activity in operation 322. Network activity from one or more devices 120-126 of the home network 104 may trigger a security feature, as described in more detail below. If updates to the security policy are received, the security platform 132 may update the security profile for the home network 104 accordingly in operation 324. For example, a parental control may be applied to a device 120-126 of the network 104 as describe above. Upon update of the profile, the security platform 132 may again determine if additional updates are received and wait for network activity.

Figure 4:
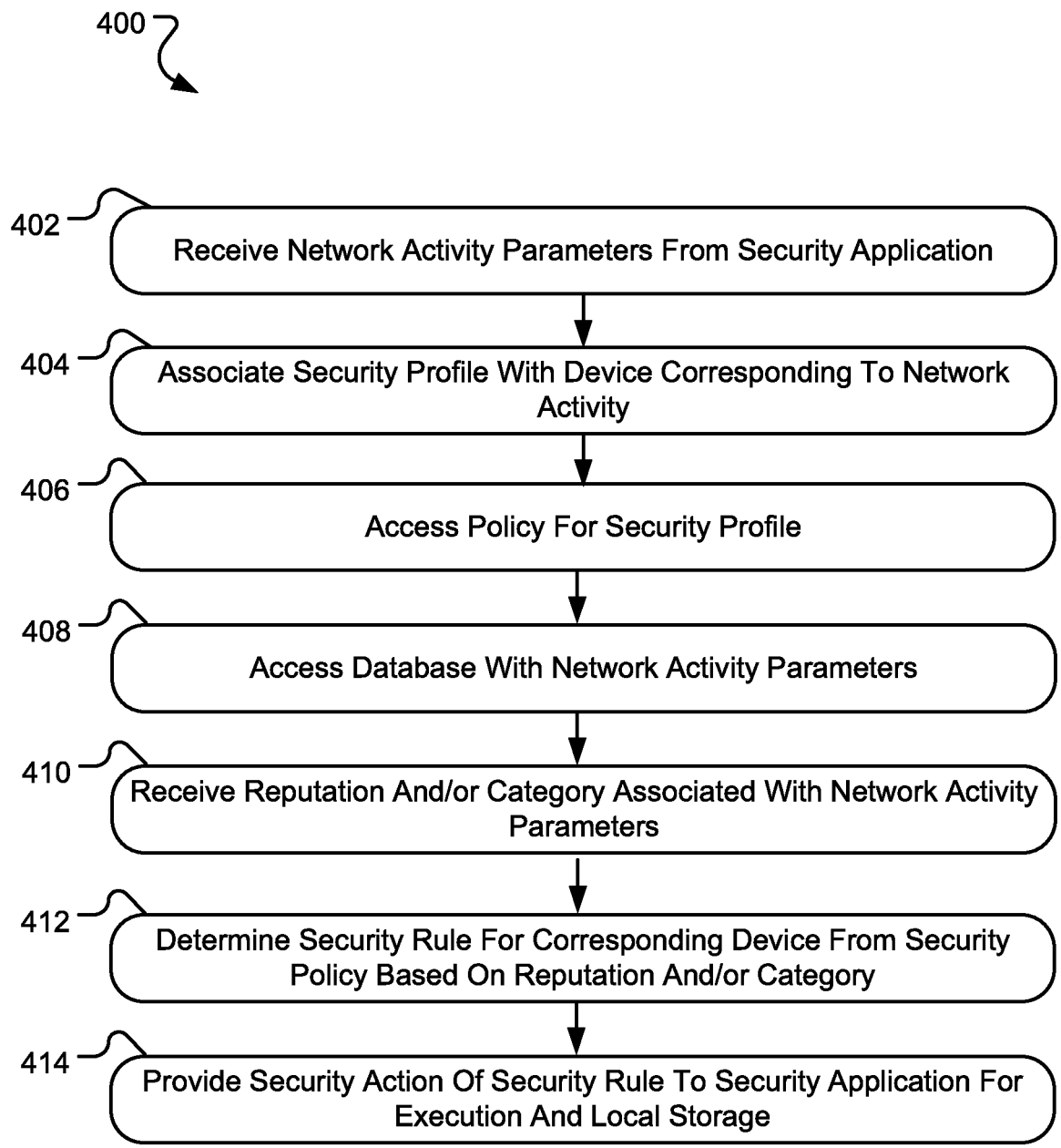
FIG. 4 is a flowchart illustrating a method for a security platform of a data network to provide security services to devices connected to the data network in accordance with one embodiment.

With the security policy for the home network 104 configured, the security platform 132 and/or the modem 116 may begin applying the policy to the devices 120-126 of the network 104. FIG. 4 is a flowchart illustrating a method 400 for a security platform of a data network 102 to provide security services to devices 120-126 connected to the data network in accordance with one embodiment. In general, the operations of the method 400 of FIG. 4 may be performed by the security platform 132. Other components of the network environments 200, 250 discussed herein, such as security application 210, 206 or computing devices 116, 126, may also perform one or more of the operations of the method 400. The operations may be executed through a combination of hardware components of the computing device and one or more instructions stored on a computer-readable medium of the device.

In operation 402, the security platform 132 may receive network activity parameters from the security application 210 executed by the operating system 208 of the modem 116 of the home network 104 or from the security application 206 executed by the operating system 204 of mobile device 126. For example, IoT device 120 may connect to the modem 116 of the home network 104 as described above and may attempt to connect to a device of the Internet 108, such as an application server, or otherwise communicate with the Internet 108. To communicate with the Internet 108, the IoT device 120 may transmit a communication or request to a device of the Internet 108 via modem 116. Security application 210 executed by the modem 116 may intercept the Internet request from the IoT 120 and provide some indication or parameter of the request to the security platform 132. For example, the security application 210 may provide a Uniform Resource Locator (URL) of a requested website, a destination IP address included in the request, a file name requested to be downloaded, and the like. In some instances, the security application 210 may extract or generate a portion of the request (such as a destination IP address from the header) and transmit the portion to the security platform 132 for analysis. In other instances, the security application 210 may forward the communication from the IoT device 120 to the security platform 132 without altering or extracting portions of the request. In this manner, the security application 210 may be a gateway for requests from each of the devices 120-126 connected to the modem 116 in communication with the Internet 108 to provide security services for the home network 104.

In another example illustrated in FIG. 2B, the mobile device 126 may be moved from the home network 104 and connect to the Internet 108 via a wireless network 106 away from the home network 104. For example, mobile device 126 may be a smart phone that connects to a public network 106 at a library or school via modem 128. In this instance, the security application 206 executed on the mobile device 126 may intercept the requests from the mobile device 126 to the Internet 108 in a similar manner as above and transmit the requests to the security platform 132 via modem 128. In one instance, the security application 206 may identify requests to the Internet 108 and replace a destination address of the request to an IP address of the security platform 132. In other instances, the security application 206, similar to security application 210 of modem 116, may extract or generate a portion of the request and transmit the portion to the security platform for analysis. Through the security application 206 executed on the mobile device 126, the security policy for the home network 104 may be applied to devices when connecting the Internet via wireless networks 106 away from the home network 104. The device requests or portions of requests may therefore be transmitted to the security application 210 as network activity parameters via security application 210 of modem 116 of security application 206 executed on the mobile device 126.

In operation 404, the security platform 132 may associate a security profile with the device corresponding to the received network activity. As mentioned above, the modem 116 may provide device identifiers for each device 120-126 of the home network 104, including IP addresses associated or assigned to each device 120-126. The requests transmitted by a device, such as mobile device 126, may include a source address identifier corresponding to the assigned IP address for that device. In another example, the security application 210 may provide the network activity parameters to the security platform 132 with an identifier of the modem 116 or the home network 104. A database 214 of home network identifiers and/or device identifiers and the associated security profile for the identifiers may be maintained and accessed by the security platform 132. With the device 120-126 identifier, the modem 116 identifier, or the home network 104 identifier, the security platform 132 may determine a security profile associated with the home network 104 from a database, such as database 214. In operation 406, the security platform 132 may access a security policy for the home network 104 and/or one or more devices 120-126 of the home network 104 based on the determined security profile for the received communication. The security policy may be configured via security platform 132 and may include, as described above, virus and malware protection, parental controls, white lists of websites, black lists of websites, and the like.

In operation 408, the security platform 132 may access the database 214 based on one or more aspects of the received network parameter from the home network 104 or mobile device 126. For example, the security platform 132 may obtain a requested webpage or URL from the received request and, based on the obtained URL, access one or more entries in the database 214 associated with the URL. Entries in the database 214 may include a reputation, a category, a security risk score, and the like associated with the URL. In another example, the security platform 132 may obtain, from the request, an identifier of a file or other downloaded content from a device of the Internet 108. The security platform 132 may utilize the identifier of the file or other content to access one or more entries in the database 214 to obtain information of the requested file, such as a reputation, category, risk of the file containing a virus, etc. In general, any aspect of the received request may be used by the security platform 132 to access entries in the database 214 for application of one or more security features, such as a destination IP address, a URL, a webpage identifier, a file identifier, an Internet device identifier, and the like.

In operation 410, the security platform 132 may receive a reputation, category, risk score, etc. from the database 214 based on the network activity parameter utilized to access the database. The reputation of the network activity may include a risk score or other identifier that provides an indication of known risk of the requested network access. For example, an IP address of the Internet 108 may be known as risky or to include one or more viruses that may infect a device accessing the IP address. The reputation of the URL or downloadable file may be provided to the database 214 via a third party configured to determine potential risks of the Internet 108. In another example, the reputation of the URL or downloadable file may be determined by a computing device (such as an application server) in communication with the database 214. As explained above, the computing device of the database 214 may analyze traffic patterns of the data network 102 and/or receive reported risks encountered during accessing the Internet 108 and store a risk assessment in the database 214 with an identifier of the risky URL or file. In one example, the reputation of the network activity may include a "safe" identifier, an "unknown" identifier, a "moderate risk" identifier, a "extreme risk" identifier, and the like. In another example, a score or other value may be associated with a reputation for the network activity, such as a score from 0-100 that ranges from safe to extreme risk. Other metrics, scales, values, or the like for identifying a reputation of a URL, file, device, or the like of the Internet 108 may be used and stored in the database 214.

The database 214 may also include a category associated with the network activity, such as a category of a URL or file. In general, the category may include an identifier of the type of content included in or associated with the URL or file. For example, a gambling website or URL may be categorized under a "gambling" identifier. Similarly, a website including pornography may be categorized with a "pornography" identifier. Files, such as images, videos, and other multimedia content, known to include explicit images or content may be categorized as "explicit", "adult", "inappropriate for children", and the like. Websites or files known to be safe for children may be categorized as "safe" or "appropriate for all ages". In general, the category associated with a URL or file may indicate the content of any portion of the website or file and may indicate any type of content. Further, the category of a URL or file may be provided by a third party configured to identify the content of websites and files of the Internet 108 or may be generated based on analysis of the websites or files conducted by an application server or other computing device. For example, the application server may analyze the Hypertext Markup Language (HTML) of a website to identify particular words of the website and assign a category to the website based on the HTML analysis.

In operation 412, the security platform 132 may determine a security rule from the home network 104 security policy to be applied to the device from which the request was received based on the obtained reputation and/or category of the network activity included in the request. For example, an Internet request received at modem 116 may be provided to security platform 132 as discussed above. Security platform 132 may access, from the database 214, a reputation and/or category associated with the request received from the modem 116. The security policy associated with the home network 104 may include one or more rules based on the reputation and/or category information received from the database 214. For example, the security policy for the home network 104 may include a rule set that prohibits access to a URL that has a risk score above 80 or a category of "gambling". The security platform 132 may compare the received network activity information from the database 214 to the rule sets of the security policy for the home network 104 to determine if a security action is to be taken on the request. For example, if the reputation of the network activity exceeds the threshold value or the category of the network activity matches a banned category, a security rule of the security policy may define a security action to undertake on the Internet 108 request.

Further, the security policy for the home network 104 may include different rule sets for the different devices 120-126 of the home network 104. For example, computing device 122 may be associated with an adult user of the home network 104 and thus may include a first security rule set that allows for accessing adult-oriented websites. Mobile device 126 may be associated with a child user of the home network 104 and the security policy may include stricter security rules for the device. Thus, the rule set applied by the security platform 132 may vary based on the identification of the device associated with the Internet 108 request. The security platform 132 may therefore determine an identification of the device from which the request was received to determine a rule set from the security policy to apply to the request.

In another example, the request may be received from mobile device 126 accessing the Internet 108 via wireless network 106. The security application 206 transmits the request to security platform 132, including an identification of the mobile device 126. The security platform 132 may access the database 214 to determine a reputation and/or category of the request. In addition, the security platform 132 may access a security policy associated with the mobile device 126 (as included in the security policy for the home network 104) and apply the reputation and/or category to the rule sets of the security policy associated with the mobile device 126. In this manner, even when connecting to the Internet 108 via a network away from the home network 104, the security policy for the home network 104 may be applied to the mobile device 126.

After application of the reputation and/or category of the network activity the security policy for the home network 104 and/or device 120-126, the security platform may determine a security action to execute to the request. The security action may be defined in the rule set or security policy in response to the network activity and information accessed from the database 214. In operation 414, the security platform 132 may provide the security action to the device in response to receiving the request from the device. For example, the security platform 132 may provide the security action to the modem 116, and more particularly to the security application 210 of the modem 116, for application to the network activity. For example, the security action may include blocking access to the requested URL or file. The security application 210 may instruct the modem 116 to block the request to the Internet 108 from the device 120 to protect the device from accessing a risky website or file. In some instances, the modem 116 may redirect the requesting device 120 to a webpage that displays information on the action taken by the modem 116. In another example, the security action may include allowing access, but removing some portion of a displayed website that may exceed a risk score or reputation indication. In some instances, the security action may allow access to the Internet 108 based on the request. The modem 116 may apply the received security action or otherwise control the access to the Internet 108 for the requesting device.

In a similar manner, the security platform 132 may provide the security action to the security application 206 executed by the mobile device 126. The security application 206 may enforce or execute the security action on the requests transmitted by the mobile device 126 to block or otherwise monitor the Internet access by the mobile device 126. In some instances, the security action may allow access to the Internet 108 based on the request. The security application 206 may therefore receive the security action determined by the security platform, through application of the security policy for the home network 104 and associated devices 120-126, and enforce the security policy on the mobile device 126.

In addition to executing the security action, the security application 210, 206 may locally store the security action with an indication of the Internet 108 access request. For example, the security platform 132 may determine a blocking security action for a particular request based on the security policy for the requesting device 126 and return the blocking security action to the requesting device. The device 126 may store one or more aspects of the request and the returned blocking security action. Additional requests to the same URL or file may then be blocked by the security application 210, 206 without transmitting the request to the security platform 132 first. In other words, known security actions for particular network activity may be automatically undertaken by the security application 210, 206 without further comparison to the security policy for the home network 104. In some instances, the local storage of the security action and request may include a time stamp or other time indicator. Stored security actions that exceed a time threshold may be discarded or removed from local storage such that the particular network activity may again be checked against the security policy by the security platform 132. This may ensure that updates to the security policy are enforced by the security applications 210, 206 after expiration of the time limit. The time limit for a security action may be any amount of time, such as a day, a week, 10 days, etc.

The security platform 132 may therefore provide security features for devices 120-126 of the home network 104, whether those devices connect to the data network 102 via the modem 116 of the home network 104 or via a different network. A security application 210, 206 of the modem 116 of the home network 104 and/or of the devices 120-126 of the network may communicate with the security platform 132 to receive security actions for requests to the Internet 108 based on a security policy associated with the home network 104. The security policy may be configured via a user interface 212 to the security platform 132 such that an administrator of the home network 104 may monitor and control the security features provided to the network. Further, the security policy may be configured through one interface and apply to each of the devices 120-126 of the home network 104, instead of using multiple, differing security applications, each with their own interface on which policy may be configured. As such, the security platform 132 provides a fast and convenient portal through which security policies for multiple devices may be configured and executed.

Figure 5:
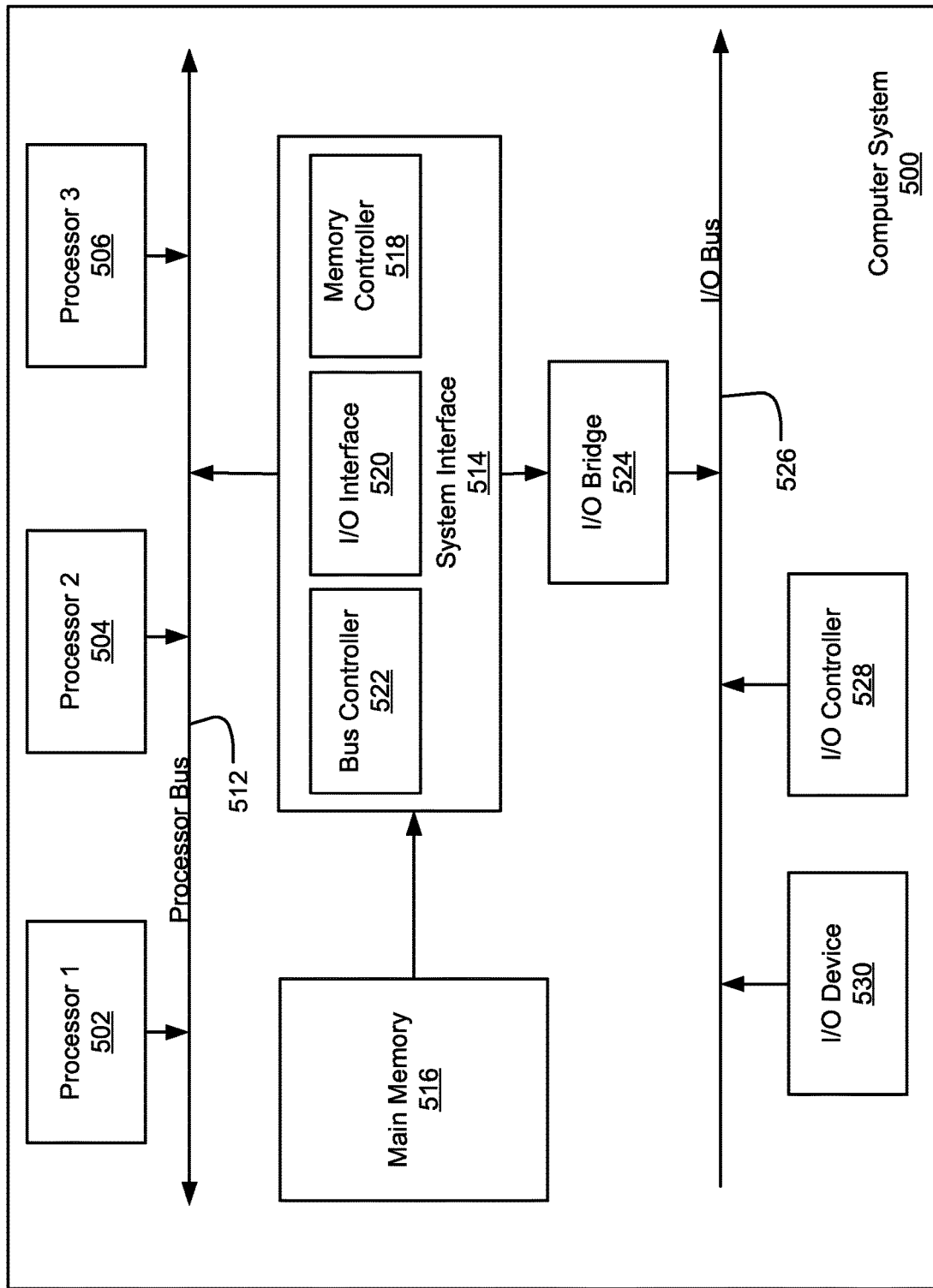
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the security platform 132 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for providing security features to a network, the method comprising:
   instructing a routing device of a wireless network and a device in communication with the routing device to each install a security application configured to communicate a security platform of a data network;
   receiving, from the security application of the device or the routing device, a request to access a public network, wherein the request to access the public network is received from the device via a public wireless network different than the wireless network;
   transmitting, to the security application of the device or the routing device, a security action based on a parameter of the received request and a security policy for the wireless network, the security action comprising an instruction for processing the request to access the public network.

2. The method of claim 1 further comprising:
   accessing, based on the parameter of the received request, a database comprising an entry associating a reputation indicator and a category with the parameter of the received request.

3. The method of claim 2 further comprising:
   comparing the reputation indicator and the category associated with the parameter of the received request to at least one security rule of the plurality of security rules of the security policy, the at least one security rule comprising the reputation indicator and the category as an input and the security action as an output.

4. The method of claim 3 wherein the request to access the public network further comprises a device indicator and the at least one security rule further comprises the device indicator as an input.

5. The method of claim 1 wherein the instruction for processing the request comprises blocking, via the security application, access to the public network.

6. The method of claim 1 further comprising:
configuring, based on an input provided to a user interface associated with the security platform, the security policy to include a security rule for interacting with a public network.

7. A networking apparatus comprising:
a processing device; and
a non-transitory computer-readable medium encoded with instructions that when executed by the processing device cause the processing device to:
transmit an instruction to a routing device of a wireless network and a device in communication with the routing device to each activate a security application configured to communicate with a security platform of a data network;
receive, from the security application, a request to access a public network different than the wireless network, the request originating from the device, wherein the device is a wireless device and the request to access the public network is received from the device via a public wireless network different than the wireless network; and
instruct the security application to execute an action on the request to access the public network, the action based on a security rule identified by a parameter of the received request.

8. The networking apparatus of claim 7 wherein the instructions further cause the processing device to:
receive one or more user inputs via a user interface, the plurality of security rules selected based on the one or more user inputs.

9. The networking apparatus of claim 7 wherein the instructions further cause the processing device to:
receive, from the routing device, an identifier of each of the devices communicating with the wireless network; and
correlate the request to access the public network with the identifier associated with the device.

10. The networking apparatus for claim 7 further comprising:
a database comprising an entry associating a reputation indicator and a category with the parameter of the received request.

11. The networking apparatus of claim 10 wherein the instructions further cause the processing device to:
compare the reputation indicator and the category associated with the parameter of the received request to at least one security rule of the plurality of security rules of the security policy, the at least one security rule comprising the reputation indicator and the category as an input and the security action as an output.

12. The networking apparatus of claim 7 wherein the security application is a container-based application.

13. The networking apparatus of claim 7 wherein the action comprises blocking, via the security application of the device, access to the public network.

14. The networking apparatus of claim 7 wherein the action comprises redirecting, via the security application of the device, the device to a webpage displaying information on the action.

15. The networking apparatus of claim 7 wherein the instructions further cause the processing device to:
configure, based on an input provided to a user interface associated with the security platform, the security policy for devices communicating with the wireless network.

16. A security platform for a network comprising:
a database storing a plurality of security profiles, each of the plurality of security profiles associated with a corresponding customer network; and
a security controller, the security controller including a processor and a non-transitory computer-readable medium encoded with instructions that when executed by the processor cause the security controller to:
receive, via a user interface, one or more user inputs indicating a plurality of security rules for inclusion in one of the security profiles associated with a first customer network, the security policy comprising a plurality of security rules for interacting with a public network;
configure, based on the indicated plurality of security rules, a security policy for the first customer network;
instruct a routing device of the first customer network and a device in communication with the routing device to each install a security application configured to communicate with the security controller; and
receive, from the security application of the device, a request to access the public network, wherein the request to access the public network is received from the device via a public wireless network different than the wireless network; and
transmit, to the security application of the device and based on a request from the device to access the public network, a security action based on a parameter of the received request and the security policy for the first customer network.

17. The security platform of claim 16 wherein the request to access the public network further comprises a device indicator assigned by the routing device and the security policy further comprises the device indicator as an input.

* * * * *